Aug. 11, 1964    J. H. LANAHAN ETAL    3,143,791
WORK POSITIONING TABLE
Filed March 21, 1962

*Inventors*
John H. Lanahan
Robert I. Leach
By their Attorney

Carl E. Johnson.

3,143,791
WORK POSITIONING TABLE
John H. Lanahan, Whitesboro, and Robert I. Leach, Clinton, N.Y., assignors, by mesne assignments, to United Shoe Machinery Corporation, Boston, Mass., a corporation of New Jersey
Filed Mar. 21, 1962, Ser. No. 181,353
5 Claims. (Cl. 29—203)

This invention relates to devices for positioning a work piece relative to a template or the like so that an associated machine can perform successive operations on the work piece and more particularly concerns such work positioning devices or tables wherein movement in any horizontal direction is desired such as for the insertion of components in a printed circuit board.

An object of the present invention is to provide an improved work positioning table having easily-movable, firmly-anchored platform means for holding a work piece and locating means for accurately positioning in any horizontal direction the platform means relative to a template.

An additional object is the provision of an improved work positioning table which has a heavy base directly supporting an in-out-movable carriage and has a right-left-movable work platform supported by the carriage with the supporting means avoiding high friction connections yet providing accurate positioning.

Another object is to provide an improved work positioning table having support means for accurately positioning a work piece relative to a template wherein stylus locating means and handle means permits adequate observation of the template and work piece and give ease in mounting the successive work pieces.

A further object is the provision of an improved work positioning table having locating means which provides final positioning of the work piece relative to the template by the cooperation of a stylus mating with a template identation and wherein the stylus when mated closes a switch for the energization of an associated machine for operating on the workpiece.

An additional object is to provide such an improved work positioning table having a work platform connected to and supported by a base-supported carriage and further having openings in the carriage and platform whereby access to the bottom of a work piece is provided.

The realization of the above objects of the invention along with the features and advantages thereof will be apparent from the following description and the accompanying drawing in which.

Figure 3:
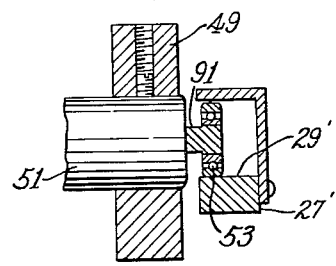
Figure 4:
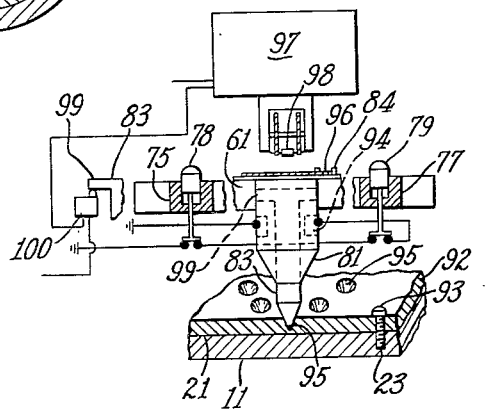

FIGURE 3 is a cross sectional view of the carriage extension or finger at the right front which connects to the platform transverse support rod and the ball bearing wheel which rides on a modified rail to be mounted on the right side of the base; and FIGURE 4 is a schematic showing of parts of the work positioning table and a machine for inserting components into a printed circuit board and suggests how the stylus or pointed plunger will fully bottom or mate with an indentation in a template.

Figure 1:
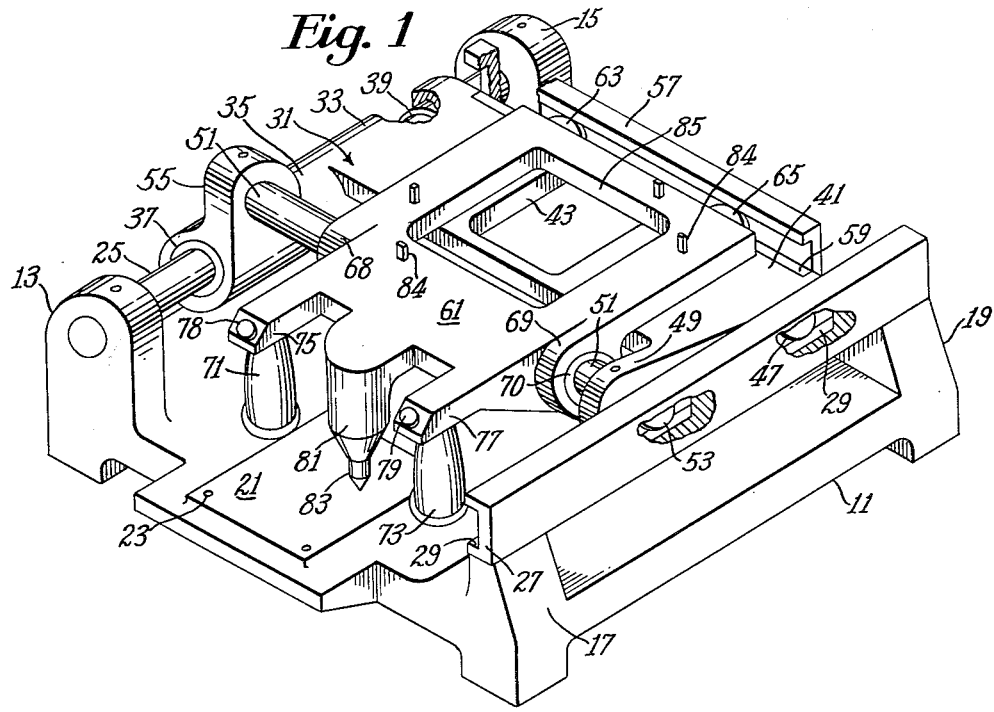
FIGURE 1 is a perspective view, with parts broken away, of a work positioning table embodying the invention and shows a heavy base, a longitudinally-movable carriage, a transversely-movable platform for a work piece, a flat front surface in the base for a template, and a stylus for mating with indentations in the template as the carriage and platform are moved on supporting rods and rails.

Referring to FIGURE 1, the base 11 is four-sided and has front, back, left and right sides. At the left front and back corners, the base 11 has upwardly-projecting carriage rod support brackets 13 and 15 while, at the right front and back corners, the base has upwardly-projecting rail supports or posts 17 and 19. At the front center part of the base 11, a front-projecting template surface 21 (raised from the flat top of the base) is provided. This surface 21 has four screw holes 23 for attaching a template.

Extending along the left side of the base 11, a carriage support rod 25 is mounted in and supported by the right front and right rear brackets 13 and 15 which have holes receiving the rod 25. At the right side, a rail 27 of U-shaped cross-section is mounted by means of fasteners (not shown) on the tops of supports or posts 17 and 19 to be parallel to rod 25. Rail 27 has a flat wheel-riding surface 29. Rod 25 and rail 27 provide support for a carriage 31 which is adapted to move in and out relative to the front of the base 11. Carriage 31 has at the left a tubular part 33 including an extension 35 surrounding rod 25 and slidably mounted thereon by means of ball bushing or ball-track bearings 37 and 39 respectively at the left front and back. Carriage 31 has transversely-extending plate-like structure 41 which has a vertical opening 43 therethrough. The right end of the rear part of the carriage 31 has a ball-bearing wheel 47 (shown schematically) mounted inside thereof. Wheel 47 rides on surface 29 of rail 27. The right part of carriage 31 also has front-projecting finger or extension 49 encasing platform support rod 51 and secured thereto. The right end of rod 51 has ball bearing wheel 53 axially mounted therein and extending to the right so that wheel 53 rides on surface 29 of rail 27. The left end of platform support rod 51 is fixedly mounted in a hole in upwardly-projecting bracket 55 of the extension 35 of carriage 31. The back part of carriage 31 has a U-shaped, platform-supporting rail 57 (which has a flat wheel-riding surface 59) mounted in the back side thereof by fasteners.

Platform 61 which is above carriage 31 has two ball-bearing wheels 63 and 65 projecting from the back side parts thereof and riding on surface 59 of rail 57. Platform 61 includes a front part having at each side tubular projections 68 and 69, each containing a ball-track bearing 70 (one partially showing). The front part of platform 61 has two knobs or handles 71 and 73 depending from side extensions 75 and 77 which project to the front and have normally-open, spring-biased switches 78 and 79 for the operator's use. Locating means 81 having a spring-biased, downwardly-movable stylus or plunger 83 projects toward the surface 21 and extends downwardly from the flat top of the work platform 61 so that the pointed stylus can mate with formations in a template on template surface 21. Platform 61 has work piece positioning pins 84 at two corners and a vertical opening 85 which overlaps carriage opening 43 and a similar opening (not shown) in the base 11 so that vertical access to the bottom of a printed circuit board or other work piece is provided. With this arrangement, a machine associated with the work positioning table can have a part extending up through the carriage 31 and platform 61 (as well as operating means extending down from above) for performing an operation on the work piece or for the support thereof.

Figure 2:
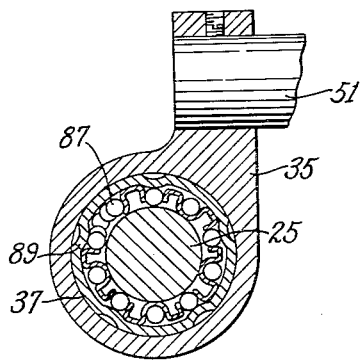
FIGURE 2 is a cross sectioned view of the upwardly-projecting bracket of the carriage carried by the rod at the left side of the base and shows part of the other rod for supporting the front of the platform and the ball track bearing of the carriage.

In FIGURES 2 and 3, details of the two types of ball bearing means for providing a minimum of friction are shown. In FIGURE 2, the conventional ball bushing or ball-track bearing 37 is shown with track parts omitted at the upper left to suggest how the balls 87 move at the ends of tracks 89 which provide oval-shaped paths for the balls with rolling contact at one side with carriage support rod 25. Platform rod 51 is fixedly mounted in the carriage bracket 55 and extends to the right for front support for the transversely-movable platform. It can be realized that carriage rod 25 supports the platform rod 51. Bracket 55 which is part of carriage extension 35 provides one connection via rod 51 so that carriage 31 and platform 61 move forwardly and rearwardly together. In FIGURE 3, the ball-bearing wheel 53 is shown with its axle 91 mounted axially in the end of rod 51 so that rod 51 is supported by rail 27'. Rail 27' has a two-part construction which provides a U-shaped cross section with the recess facing inwardly so that ball bearing wheel 53 rides on surface 29'. Platform supporting rod 51 has the carriage finger or extension 49 fixedly connected so that the platform and carriage are connected at this location for forward and rearward movement together. The top of U-shaped rail 27' is slightly spaced from the top of wheel 53. With this arrangement in both types of rails, vertical confinement is provided to prevent lifting as might occur when the work positioning table is used with a drill press. It is to be noted that the rails opposite the two perpendicularly-arranged rods are separately mounted to provide an arrangement which does not present any tendency toward binding as might occur with structures which are integrally part of the base or the carriage.

In FIGURE 4 which schematically suggests the operation of the locating means 81 having pointed plunger 83 in relation to a template and the process of inserting components into a printed circuit board, a template 92 is shown mounted on surface 21 of the base 11 by screw 93 received in hole 23. Other parts of the table are shown schematically and include now manually closed switches 78 and 79 which are connected in series and have a connection to a solenoid coil 94 in locating means 81. Coil 94 is adapted thus to be energized to move the pointed stylus or plunger 83 into a mating conical indentation 95 in the template 92. As shown, the stylus 83 has fully bottomed in indentation 95. A printed circuit board 96 is positioned on platform 61 by pins 84. Above the printed circuit board 96, a representation of a component inserting machine 97 (such as the Dynasert machine manufactured by the United Shoe Machinery Corporation) is shown arranged to insert endwise the leads of a resistor 98 into the printed circuit board 96. This insertion will occur when the top flange 99 of the lowered plunger or stylus 83 closes a machine actuating circuit including a limit switch 100. This closing occurs when stylus 83 is fully-bottomed in the mating indentations 95 in the template 92. In the interest of clarity, the switch 100 and part of the stylus 83 with flange 99 are shown at the left in FIGURE 4. It is to be understood that switch 100 is mounted in locating means 81 so that it will be closed when stylus 83 bottoms in indentation 95 or travels a predetermined distance. Thus, the component 98 will be inserted or other operation performed only when the work positioning platform 61, by means of the handles 71, 73 is accurately positioned with the self-centering stylus axially alined with a selected indentation 95. The stylus 83 by bottoming and moving the platform 61 horizontally as necessary assures accurate positioning of the work piece relative to the template and hence to the work performing device. It will be clear from the foregoing, then, that operation of the switches 78, 79, after correct positioning of the platform, energizes the solenoid 94 to actuate the plunger 83, the full seating of which in a selected indentation 95 closes the switch 100 to operate the machine 97.

In operation with reference to inserting components in a printed circuit board, an operator will attach a template 92 to base 11 at surface 21 and will position a printed circuit board 96 on platform 61 by pins 84 whereby the board holes will correspond with template indentations 95. These indentations would be centered relative to the pairs of preformed lead receiving holes for a resistor or other component to be inserted in the board. Next, the operator would take one or both of the handles 71 and 73 and move the platform diagonally, transversely or longitudinally so that the pointed plunger or stylus 83 is centered over the desired one of template indentations 95 which can be numbered to indicate the proper sequence. It is to be noted that the movement of either carriage 31 or platform 61 or both will be by means of ball bearing means which give low friction and ease of movement on firmly-anchored support means including base 11, rods 25 and 51, and rails 27 and 57. When the locating means 81 is centered as mentioned, the operator must use both hands to depress at same time both switches 78 and 79 to lower the plunger 83 against resistance of its return spring whereby neither hand can be injured by the component inserting machine 97. As mentioned, this machine will not be energized until the plunger 83 has fully bottomed in the conical indentation 95 because the limit switch 100 in locating means 81 will not be closed for energizing the machine 97 until flange 99 has made the predetermined downward travel. This feature permits very accurate positioning since the plunger 83 can correctively be deflected slightly and thereby horizontally move the platform 61 if slightly initially misaligned relative to the template. Further, unless the plunger 83 is basically centered on an indentation, operation of machine 97 will not be possible. The making of the successive insertions relative to the sequenced template indentations 95 is believed apparent. With the arrangement of the projecting template surface, the handles 71 and 73 on platform side extensions 75 and 77, and the centered, projecting locating means 81, the template 92 is easily observed by the operator during successive operations. Further, the operator has an unobstructed view of the printed circuit board 92 on the flat top of platform 61 and can easily remove it and mount the next printed circuit board. With the support means provided by the base, rods, and rails, it is apparent that carriage 31 and platform 61 with locating means 81 are consistently positioned relative the heavy base 11 having template surface 21.

It is to be understood that persons skilled in the art can make changes in the disclosed embodiment without departing from the invention as set forth in the following claims.

What is claimed is:

1. A work positioning table for locating a work piece under a work performing device for successive operations in cooperation with a table-mounted template, said table comprising: a base upon which the template is secured, a carriage rod mounted at one side of the base and a carriage rail mounted in parallel relation to the rod at the other side of the base, a carriage supported by the rod and the rail for front and rear movement with respect to the base, roller bearing means for thus supporting the carriage on the rod and the rail, a platform rod perpendicular to the carriage rod and having one end mounted in the carriage, roller bearing means supporting the other end of the platform rod on said carriage rail, a platform rail secured to the rear of the carriage in parallel relation to the platform rod, a platform having roller bearing mounting on the platform rod and the platform rail, the platform being adapted fixedly to support a work piece thereon for positioning movement relatively to the carriage at the will of an operator, and locating means projecting from a central part of the platform for cooperating with selected portions of the base-mounted template.

2. A table as set forth in claim 1 and further characterized in that the front center portion of said base extends horizontally to support the template forwardly of the front ends of the carriage rod and the carriage rail, respectively, and handle means projects downwardly from the platform and to one side of and above said base front center portion to facilitate operator movement of the platform horizontally and operator observation of a work piece thereon.

3. A table as set forth in claim 2 further characterized in that said locating means includes a vertically movable stylus for mating with formations on the template on said base, and means under the control of the operator as he grips the handle means for causing the stylus to mate with a selected template formation and thereby automatically effect actuation of the device.

4. A table as set forth in claim 2 and further characterized in that said base, carriage and platform, respectively, have openings which overlap thereby providing access for the device to the under side of a work piece on the platform.

5. A table as set forth in claim 3 and further characterized in that the mating end of the stylus is conical for reception in correspondingly spaced template formations, and the control means includes electrical circuitry for energizing the stylus and the device, said circuitry including manually-operable, series-connected normally-open switches in the handle means for actuating the stylus, and a limit switch arranged to be closed in response to reception of the stylus in a selected template formation to actuate the device.

References Cited in the file of this patent

UNITED STATES PATENTS

| | | |
|---|---|---|
| 2,116,251 | Schiltz | May 3, 1938 |
| 2,933,022 | Stark | Apr. 19, 1960 |
| 3,043,587 | Underhill | July 10, 1962 |